Aug. 21, 1956  G. S. HARTLEY  2,759,300
METHOD AND MEANS FOR INTRODUCING A PREDETERMINED AMOUNT
OF A POISONOUS MATERIAL BENEATH THE SURFACE OF THE SOIL
Filed Aug. 11, 1954
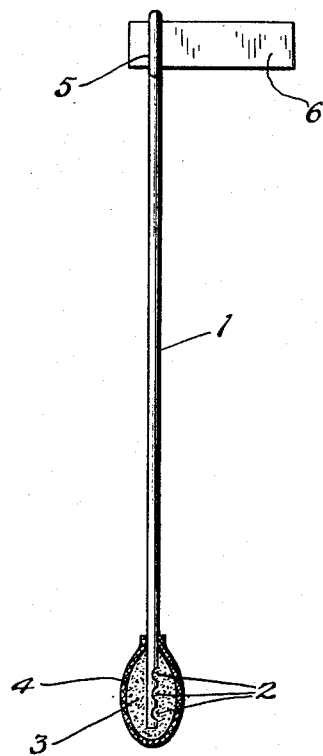
INVENTOR.
Gilbert Spencer Hartley
BY.

United States Patent Office 2,759,300
Patented Aug. 21, 1956

2,759,300

METHOD AND MEANS FOR INTRODUCING A PREDETERMINED AMOUNT OF A POISONOUS MATERIAL BENEATH THE SURFACE OF THE SOIL

Gilbert Spencer Hartley, Fulbourn, England, assignor to Pest Control Limited, Bourn, England, a company of Great Britain Application August 11, 1954, Serial No. 449,268

7 Claims. (Cl. 47—58)

This invention relates to method and means for introducing a predetermined amount of a poisonous material beneath the surface of the soil.

In my co-pending application Serial No. 360,613, filed June 9, 1953, I have described a device whereby poisonous material can safely be divided into units of predetermined size which can be packed, transported, stored and introduced into the soil. The said device comprises a shaft strong enough to be thrust into the soil, provided with a head of a solid material surrounding one end of the shaft, the said head consisting at least in part of a predetermined quantity of a systemic insecticide, and being coated with a plastic material which will dissolve within a reasonable time in the moisture of the soil. In use, the device is thrust head first into the ground.

As described in my said copending application the plastic material for the coating may consist of a water-soluble material, such as gelatine, which produces a smooth finished surface when dry, in which there is incorporated a mineral, or preferably a fibrous filler, such as asbestos or cotton linters, to reduce the tendency of the dry coating to crack. It will be appreciated that such a coating is formed by applying to the head of the device a suspension of the filler in concentrated aqueous solution of the water-soluble material, and drying the coating. In use, when the head of the device is thrust in the ground, the water-soluble material, but not of course the filler, dissolves in the moisture of the ground, causing the coating to disintegrate.

I have now found that improved results can be obtained by employing for the coating a petroleum, vegetable or insect wax of a melting point of at least 100° F., having distributed therein one or more water-soluble or water-swellable organic substances in a finely divided state and of low bulk density, which will dissolve or swell within a reasonable time in the moisture of the soil so as to cause the coating to disintegrate.

Suitable water-soluble or water-swellable organic substances are solid high-molecular weight organic substances, such as methyl cellulose, hydroxyethyl cellulose, mixed methylhydroxyethyl cellulose, sodium carboxymethyl cellulose, sodium alginate, sodium cellulose acetate-phthalate, and water-soluble starch.

Accordingly the present invention provides a device for use in introducing a predetermined quantity of a systemic insecticide beneath the surface of the soil, comprising a shaft strong enough to be thrust into the soil, provided with a head of a solid material surrounding one end of the shaft, the said head consisting at least in part of the predetermined quantity of a systemic insecticide, and being coated with a petroleum, vegetable or insect wax of a melting point of at least 100° F., having distributed therein one or more water-soluble or water-swellable organic substances in a finely divided state and of low bulk density, which will dissolve or swell within a reasonable time in the moisture of the soil so as to cause the coating to disintegrate.

The invention also provides a method of introducing a predetermined quantity of systemic insecticide beneath the surface of the soil, comprising thrusting head first into the soil a shaft strong enough to be thrust into the soil, provided with a head of a solid material surrounding one end of the shaft, the said head consisting at least in part of a predetermined quantity of a systemic insecticide, and being coated with a petroleum, vegetable or insect wax of a melting point of at least 100° F., having distributed therein one or more water-soluble or water-swellable organic substances in a finely divided state and of low bulk density, which will dissolve or swell within a reasonable time in the moisture of the soil so as to cause the coating to disintegrate.

Suitable waxes include paraffin wax, vegetable waxes and beeswax.

Whereas the coating material employed according to my co-pending application is applied to the head of the device in admixture with water and subsequently dried, no water is required for the application of the coating material of the present invention, since it can be applied as a suspension of the water-soluble or water-swellable organic substance in molten wax and then be set by cooling. There is thus no danger of the systemic insecticide of the head being affected by water during coating and drying.

For a more complete understanding of the invention reference should now be had to the accompanying drawing which is a front elevational view of one embodiment of this invention showing a device for introducing a predetermined amount of a poisonous material beneath the surface of the soil, the head containing the poisonous material being illustrated in section.

Referring now, more particularly, to the illustrated figure, a rigid rod or wire 1 is provided with notches 2 at its lower end portion. The latter notches serve to assist the securing of the rod to a mass of systemic insecticide 3, which forms a solid head at the lower end limit of the rod 1. Disposed about the outer periphery of the active insecticide material is a coating envelope 4, comprising a hardened wax coating containing a suspension of a water-swellable or water-soluble organic substance. A hook or clamp 5 is disposed at the upper end portion of the rod for the purpose of securing thereto a label 6 or the like.

The best results have been obtained with highly purified water-soluble starch in its natural state of division which forms an excellent suspension in molten wax with little or no agitation. The use of this starch gives a smoother and harder finish to the coating than does the use of any other water-soluble or water-swellable organic substance.

In use, the device of the present invention behaves in a similar way to that of my said co-pending application. In each case only one component of the coating dissolves or swells in the moisture of the soil, causing the coating as a whole to disintegrate. In the device of my co-pending application it is the continuous phase of the coating, for example gelatine, which dissolves; in the device of the present invention, however, it is the disperse phase, i. e. the water-soluble or water-swellable organic substance which dissolves or swells.

A suspension of 50–75% by weight of watersoluble starch in 50–25% by weight of molten paraffin wax can readily be applied as a coating by dipping the head of the device therein. The coating rapidly sets on cooling to give a smooth surface which is considerably harder than that obtained with paraffin wax alone. When a head of water-soluble material which has been coated in this way is introduced into moist soil, the moisture swells the starch particles and causes a gelatinous extrusion from the originally smooth surface of the coating, which renders it both mechanically weak and water-permeable. As a result of the penetration of water into the water-soluble interior of the head, an expansion of the latter occurs and the weakened coating is made still weaker and more permeable by its consequent cracking. The disintegration under wet conditions is naturally more rapid the higher the content of starch in the coating.

In the appended claims "water-soluble organic substance" means an organic substance which dissolves or swells in water to form a liquid mass, irrespective of whether a true or colloidal solution is formed.

What I claim is:

1. A device for use in introducing a predetermined quantity of a systemic insecticide beneath the surface of the soil, comprising a shaft strong enough to be thrust into the soil, provided with a head of a solid material surrounding one end of the shaft, the said head consisting at least in part of the predetermined quantity of a systemic insecticide, and being coated with a wax selected from the group consisting of petroleum, vegetable and insect wax of a melting point of at least 100° F. having distributed therein at least one material selected from the group consisting of water-swellable organic substances and water-soluble organic substances in a finely divided state and of low bulk density, which will dissolve within a reasonable time in the moisture of the soil so as to cause the coating to disintegrate.

2. A device according to claim 1, wherein water-soluble starch in its natural state of division is distributed in the said wax.

3. A method of introducing a predetermined quantity of systemic insecticide beneath the surface of the soil, comprising thrusting head first into the soil a shaft strong enough to be thrust into the soil, provided with a head of a solid material surrounding one end of the shaft, the said head consisting at least in part of a predetermined quantity of a systemic insecticide, and being coated with a wax selected from the group consisting of petroleum, vegetable and insect wax of a melting point of at least 100° F., having distributed therein at least one water-soluble organic substance in a finely divided state and of low bulk density, which will dissolve within a reasonable time in the moisture of the soil so as to cause the coating to disintegrate.

4. A device according to claim 1 wherein finely divided methyl cellulose is distributed in the said wax.

5. A device according to claim 1 wherein finely divided hydroxyethyl cellulose is distributed in said wax.

6. A device according to claim 1 wherein finely divided mixed methyl-hydroxyethyl cellulose is distributed in said wax.

7. A device according to claim 1 wherein finely divided sodium alginate is distributed in said wax.

References Cited in the file of this patent

UNITED STATES PATENTS

| 819,901 | Maschal | May 8, 1906 |
| 1,479,704 | Duddleson | Jan. 1, 1924 |
| 1,583,154 | Howard | May 4, 1926 |
| 2,298,232 | Remund | Oct. 6, 1942 |

FOREIGN PATENTS

| 388,566 | Germany | Jan. 15, 1924 |